(12) United States Patent
Nishihara

(10) Patent No.: US 8,805,585 B2
(45) Date of Patent: Aug. 12, 2014

(54) HANDLING APPARATUS, CONTROL DEVICE, CONTROL METHOD, AND PROGRAM

(75) Inventor: Yasunori Nishihara, Shizuoka (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 673 days.

(21) Appl. No.: 12/995,960

(22) PCT Filed: Jun. 3, 2009

(86) PCT No.: PCT/JP2009/060172
§ 371 (c)(1),
(2), (4) Date: Dec. 2, 2010

(87) PCT Pub. No.: WO2009/148089
PCT Pub. Date: Dec. 10, 2009

(65) Prior Publication Data
US 2011/0082586 A1    Apr. 7, 2011

(30) Foreign Application Priority Data

Jun. 5, 2008  (JP) .................................. 2008-148468
Jun. 17, 2008 (JP) .................................. 2008-158038

(51) Int. Cl.
*G06F 19/00* (2011.01)

(52) U.S. Cl.
USPC ........ 700/256; 700/213; 700/230; 29/407.04; 29/709; 198/463.2; 198/339.1; 901/7; 901/8

(58) Field of Classification Search
USPC ........... 700/110, 96, 245, 262, 213, 166, 259, 700/230, 258; 702/150, 127; 600/425; 29/407.04, 709; 198/463.2, 339.1; 901/7, 8
See application file for complete search history.

(56) References Cited

U.S. PATENT DOCUMENTS

| 5,040,056 A | 8/1991 | Sager et al. |
| 5,207,331 A | 5/1993 | Teegarden et al. |

(Continued)

FOREIGN PATENT DOCUMENTS

| JP | 7-48018 | 2/1995 |
| JP | 09-057670 | 3/1997 |

(Continued)

OTHER PUBLICATIONS

DE Office Action, Application No. 102006031178.7; mailed Sep. 12, 2007.

(Continued)

*Primary Examiner* — Ronnie Mancho
(74) *Attorney, Agent, or Firm* — DLA Piper LLP (US)

(57) ABSTRACT

A handling apparatus having a belt conveyor (2) for conveying a work (10), a robot (4) for performing a predetermined operation for the work (10), a visual sensor (3) for photographing the work (10) being conveyed to produce work data indicating each work (10) in the photographed image, and a robot controller (5) for gathering the work data for each image thereby to produce a tracking data, and for storing the tracking data in a database, thereby to control the robot (4) with the database so that a predetermined operation is performed on the work (10) transferred to the position of the robot (4). The robot controller (5) performs a predetermined calculation on the work data read out from the database, detects the overlapped work data, and cancels the control of the actions of the robot (4) based on the overlapped work data. The robot controller (5) rearranges the sequences, in which the robot (4) performs the operation on each work (10).

13 Claims, 11 Drawing Sheets

(56) References Cited

U.S. PATENT DOCUMENTS

| | | | |
|---|---|---|---|
| 5,438,525 A * | 8/1995 | Shimbara | 702/35 |
| 6,035,243 A * | 3/2000 | Galuga et al. | 700/110 |
| 7,653,977 B2 * | 2/2010 | Wiedemann et al. | 29/407.04 |
| 8,014,899 B2 * | 9/2011 | Ban et al. | 700/248 |
| 8,315,736 B2 * | 11/2012 | Kalbavi et al. | 700/250 |
| 8,417,363 B2 * | 4/2013 | Erlandsson-Warvelin et al. | 700/56 |
| 8,473,100 B2 * | 6/2013 | Kalbavi et al. | 700/245 |
| 2002/0013675 A1 * | 1/2002 | Knoll et al. | 702/150 |
| 2005/0075752 A1 * | 4/2005 | Ban et al. | 700/213 |
| 2007/0073439 A1 | 3/2007 | Habibi | |

FOREIGN PATENT DOCUMENTS

| | | |
|---|---|---|
| JP | 9-72717 | 3/1997 |
| JP | 10-277969 | 10/1998 |
| JP | 2000-219317 | 8/2000 |
| JP | 2005-111607 | 4/2005 |
| JP | 2007-15055 | 1/2007 |
| JP | 2009-28818 | 2/2009 |

OTHER PUBLICATIONS

Translation of DE Office Action, Application No. 102006031178.7; mailed Sep. 12, 2007.
U.S. Appl. No. 11/472,279.
Japanese Office Action issued in JP 2008-148468 on Oct. 2, 2012.
English translation of Japanese Office Action issued in JP 2008-148468 on Oct. 2, 2012.
Japanese Office Action issued in JP 2008-158038 on Oct. 2, 2012.
English Language Translation of Japanese Office Action issued in JP 2008-158038 on Oct. 2, 2012.
English Language Abstract of JP 09-057670 published Mar. 4, 2997.
English Language Translation of JP 09-057670 published Mar. 4, 2997.
English Language Abstract of JP 10-277969 published Oct. 20, 1998.
English Language Translation of JP 10-277969 published Oct. 20, 1998.
English Language Abstract of JP 2005-111607 published Apr. 28, 2005.
English Language Abstract of JP 7-48018 published Feb. 21, 1995.
English Language Abstract of JP 2007-15055 published Jan. 25, 2007.
English Language Abstract of JP 2009-28818 published Feb. 12, 2009.
English Language Translation of JP 2005-111607 published Apr. 28, 2005.
English Language Translation of JP 7-48018 published Feb. 21, 1995.
English Language Translation of JP 2007-15055 published Jan. 25, 2007.
English Language Translation of JP 2009-28818 published Feb. 12, 2009.
International Search Report issued in PCT/JP2009/060172 on Aug. 18, 2009.
U.S. Appl. No. 12/637,436.

* cited by examiner

HANDLING APPARATUS, CONTROL DEVICE, CONTROL METHOD, AND PROGRAM

TECHNICAL FIELD

The present invention relates to a handling system for processing a workpiece conveyed by a belt conveyor with a high efficiency, and, a control device, a control method, and a program relating to the same.

BACKGROUND ART

There is known a handling system arranged a visual sensor at an upstream side of a belt conveyor, detecting an article (hereinafter described as a "workpiece") conveyed by the belt conveyor, and using output data of the visual sensor to control an operation performed by a robot on the workpiece. For example, a handling system shown in the following Patent Document uses a visual sensor to capture an image of each workpiece conveyed by a belt conveyor, prepares data linked with each workpiece, and transmits the data to a robot controller. The robot controller prepares a database of received data and performs processing on a workpiece reaching a work position of the robot by conveyance by the belt conveyor based on the data read out from the above database.

PRIOR ART DOCUMENT

Patent Document

Patent Document 1: Japanese Patent Publication (A) No. 2007-15055

SUMMARY OF THE INVENTION

Problems to be Solved by the Invention

The system disclosed in the Patent Document 1 sequentially stores data transmitted from the visual sensor to construct a database and controls the operation of the robot in accordance with the content stored in the database.

As a result, when the visual sensor consecutively captures images several times, each captured image includes a portion showing the same workpiece overlapped. Since the workpiece data in such overlapping portions are also stored in the database, waste operations of the robot may occur.

Also, a plurality of workpieces conveyed by a belt conveyor are not always processed in order from the downstream side of conveyance. The operation of the robot becomes complicated and a workpiece placed downstream in conveyance sometimes can no longer be processed.

Accordingly, it has been desired to discriminate repeatedly detected portions and process workpieces conveyed by the belt conveyor in a sequence with a good efficiency.

Solution to Problem

A handling system of the present invention has: a conveying means for conveying a workpiece, a robot performing a predetermined work to the workpiece, a visual sensor capturing an image of the workpiece being conveyed and producing workpiece data indicating every each workpiece in the captured image, and a controlling means for gathering the workpiece data for each of the images thereby to produce tracking data, accumulating the tracking data in a database, and using the database so as to control the robot so as to perform the predetermined work for the workpiece conveyed at a position of the robot, wherein the controlling means processes the tracking data accumulated in the database, recognizes an actual state of each of the workpieces conveyed by the conveying means, and makes the robot operate in accordance with an actual conveyance state of each of the workpieces.

Also, in the handling system of the present invention, the controlling means reads out the workpiece data stored in the database to perform a predetermined processing and rearranges a sequence by which the robot performs work for a plurality of workpieces.

Further, in the handling system of the present invention, the controlling means controls so as to start the work from which the workpiece is positioned at a downstream side of conveyance of the conveying means.

Further, in the handling system of the present invention, the controlling means has: a storage part storing, as the database, tracking data which are captured the workpiece data and transmitted from the visual sensor, and are gathered the same as each image captured by the visual sensor, a processing part finding a scalar quantity of a mapping vector of each workpiece from each workpiece data included in the tracking data and rearranging a work sequence to be performed by the robot based on the scalar quantity of the mapping vector of each of the workpieces, and a drive control part controlling the robot so as to perform the work of each of the workpieces in accordance with the sequence rearranged by the processing part.

Further, in the handling system of the present invention, the processing part performs processing to find an inner product of a vector P and a vector Cv, to result in the scalar quantity of the mapping vector of each of the workpieces, where the vector P is defined as a vector from any reference point to each workpiece, and the vector Cv is defined as a reference vector indicating the conveyance direction of the conveying means from that any reference point the vector Cv.

Further, in the handling system of the present invention, the controlling means performs the predetermined processing for the workpiece data for every each tracking data read out from the database to detect the overlapping workpiece data, and cancels the control of the operation of the robot based on the overlapping workpiece data.

Further, in the handling system of the present invention, the controlling means has: a storage part storing each tracking data produced for each of the images, as the database, a processing part finding a distance between workpieces from the workpiece data included in the tracking data and judging whether the workpiece data overlap based on the distance between the workpieces, and a drive control part controlling the robot so as to perform work for each of the workpieces in accordance with the judged result of the processing part.

Further, in the handling system of the present invention, when the distance between workpieces found from the workpiece data is smaller than a predetermined value, the processing part judges that the workpiece data corresponding to the workpieces having the distance do not overlap.

A control device of the present invention has: a storing means, a processing means for gathering a plurality of workpiece data which are transmitted from a visual sensor for capturing images of a plurality of workpieces being conveyed by a conveying means and correspond to the workpieces for each image captured by the visual sensor to produce tracking data, making the storing means store each tracking data of each of the images, reading out each of the tracking data from the storing means in accordance with the conveyance operation of the conveying means, performing predetermined processing on each workpiece data included in each of the tracking data, and recognizing an actual state of each of the workpieces being conveyed by the conveying means, and a drive controlling means for making the robot operate in accordance with the actual conveyance state of each of the workpieces in accordance with the processing result of the processing means so as to make the robot perform work on each of the workpieces.

Further, in the control device of the present invention, the processing means processes each of the workpiece data so as to thereby detect overlapping workpiece data included in a plurality of tracking data, and the drive controlling means cancels the overlapping workpiece data detected by the processing to control the robot so as to perform work on each workpiece corresponding to each workpiece data which does not overlap.

Further, in the control device of the present invention, the processing means processes each of the workpiece data so as to thereby find a sequence for performing work on each workpiece corresponding to each of the data of the workpieces being conveyed by the conveying means, and the drive controlling means controls the robot so as to perform the work on each of the workpieces in accordance with the sequence rearranged by the processing means.

A control method of the present invention includes: a first step of having a visual sensor capture images of a plurality of workpieces being conveyed by a conveying means and, for each image, gathering a plurality of workpiece data corresponding to each of the workpieces to produce tracking data, a second step of storing each tracking data of each of the images in a database, a third step of performing predetermined processing on each workpiece data included in each tracking data of the database in accordance with the conveyance operation of the conveying means to thereby to recognize an actual state of each of the workpieces being conveyed by the conveying means, and a fourth step of making the robot operate in accordance with the actual conveyance state of each of the workpieces to make it perform work on each of the workpieces.

Further, the control method of the present invention, in the third step, performing that processing to detect overlapping workpiece data included in the plurality of tracking data, and, in the fourth step, canceling the detected overlapping workpiece data and controlling the robot so as to perform the work on each workpiece corresponding the workpiece data which does not overlap.

Further, the control method of the present invention, in the third step, performing that processing to rearrange a sequence for performing work on for workpieces being conveyed by the conveying means, and, in the fourth step, controlling the robot so as to perform work on each of the workpieces in accordance with the rearranged sequence.

A program of the present invention makes a computer execute the following routines: a first routine of having a visual sensor capturing images of a plurality of workpieces being conveyed by a conveying means and inputting from the visual sensor workpiece data produced by that visual sensor, a second routine of gathering the input workpiece data for each image captured by the visual sensor to produce tracking data and storing it in a database, a third routine of reading out the tracking data from the database in accordance with the conveyance operation of the conveying means, performing predetermined processing on each workpiece data included in the read out tracking data to thereby recognize an actual state of each of the workpieces being conveyed by the conveying means, and a fourth routine of making the robot operate in accordance with the actual conveyance state of each of the workpieces in accordance with the result of the processing and making the robot perform work on each of the workpieces.

Effects of the Invention

According to the handling system of the present invention, waste operation of the robot is suppressed, and work can be carried out to the conveyed workpieces with a high efficiency.

Further, according to the control device of the present invention, the robot can be made perform work by using workpiece data input from the visual sensor with a high efficiency.

Further, according to the control method of the present invention, waste operation of the robot is suppressed, and work can be carried out to the conveyed workpieces with a high efficiency.

Further, according to the program of the present invention, waste operation of the robot is suppressed, and work can be carried out to the conveyed workpieces with a high efficiency.

DESCRIPTION OF EMBODIMENTS

Below, embodiments of the invention will be explained.

First Embodiment

Figure 1:
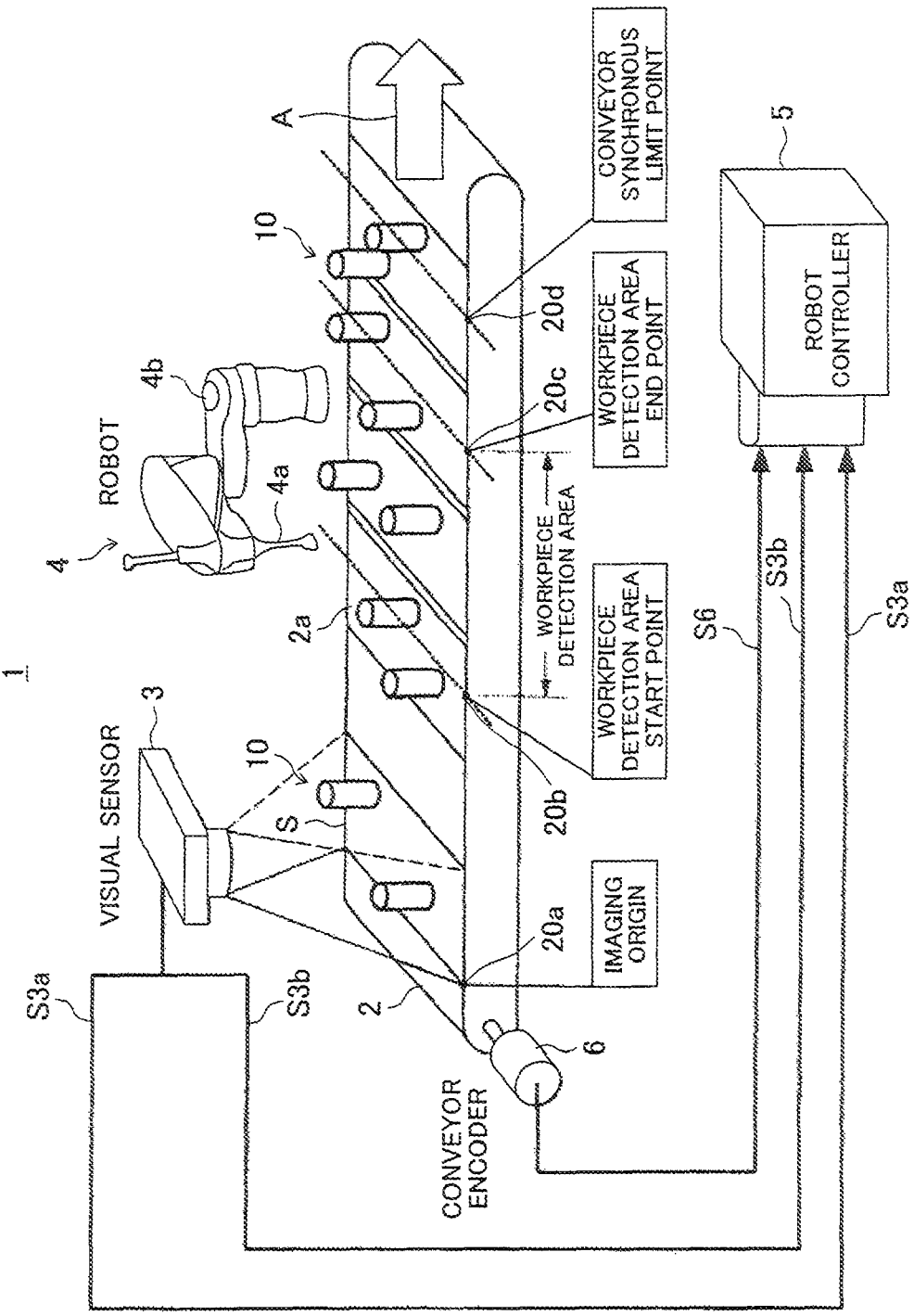
FIG. 1 An explanatory view showing the schematic configuration of a handling system according to a first embodiment of the present invention.

FIG. 1 is an explanatory view schematically showing the configuration of a handling system according to a first embodiment of the present invention. The shown handling system 1 is configured by a belt conveyor 2, visual sensor 3, robot 4, robot controller 5, and conveyor encoder 6.

The belt conveyor 2 is defined as a conveying means for conveying a workpiece 10, for example, as an article-in-process, in a direction of a conveyor vector A indicated by an arrow in the figure.

The visual sensor 3 is disposed so as to capture images of a plurality of workpieces 10 mounted on a belt conveyance surface 2a of the belt conveyor 2 at a position at an upstream side of conveyance of the belt conveyor 2.

Further, the visual sensor 3 is connected through a LAN so as to output the output data that is workpiece data S3a, and a trigger signal S3b showing the capturing timing, to a robot controller 5 explained later.

The robot 4 is provided with a holding part 4a gripping the workpiece 10 being conveyed by the belt conveyor 2, for example, one by one, and an arm part 4b supporting the holding part 4a movable within a predetermined range.

The robot controller 5 is defined as a controlling means connected so as to control the operation of the robot 4.

Further, the robot controller 5 is connected so as to input an output signal S6 of the conveyor encoder 6 explained later, and the workpiece data S3a and the trigger signal S3b transmitted from the visual sensor 3, through a communication line etc. explained above.

The conveyor encoder 6 is defined as a movement detecting means for detecting a conveyance distance of the belt conveyor 2, that is, for detecting the movement amount of the workpiece 10 placed on the belt conveyance surface 2a. The output signal S6 of the conveyor encoder 6, that is, the output signal S6 indicating the conveyor movement amount, is output to the robot controller 5.

Note that, a configuration providing one robot 4 and one robot controller 5 controlling the robot 4 is exemplified in FIG. 1. However, the system may be configured so as to provide a plurality of robots 4 and a plurality of robot controllers 5 as well.

In more detail, for example, a router is provided for receiving the workpiece data S3a and the trigger signal S3b transmitted from the visual sensor 3 to a communication line. A plurality of robot controllers 5 are connected to this router.

By this configuration, each robot controller 5 can input the workpiece data S3a and the trigger signal S3b used for the processing operation of itself from the above router, and control the respective robot 4.

Figure 2:
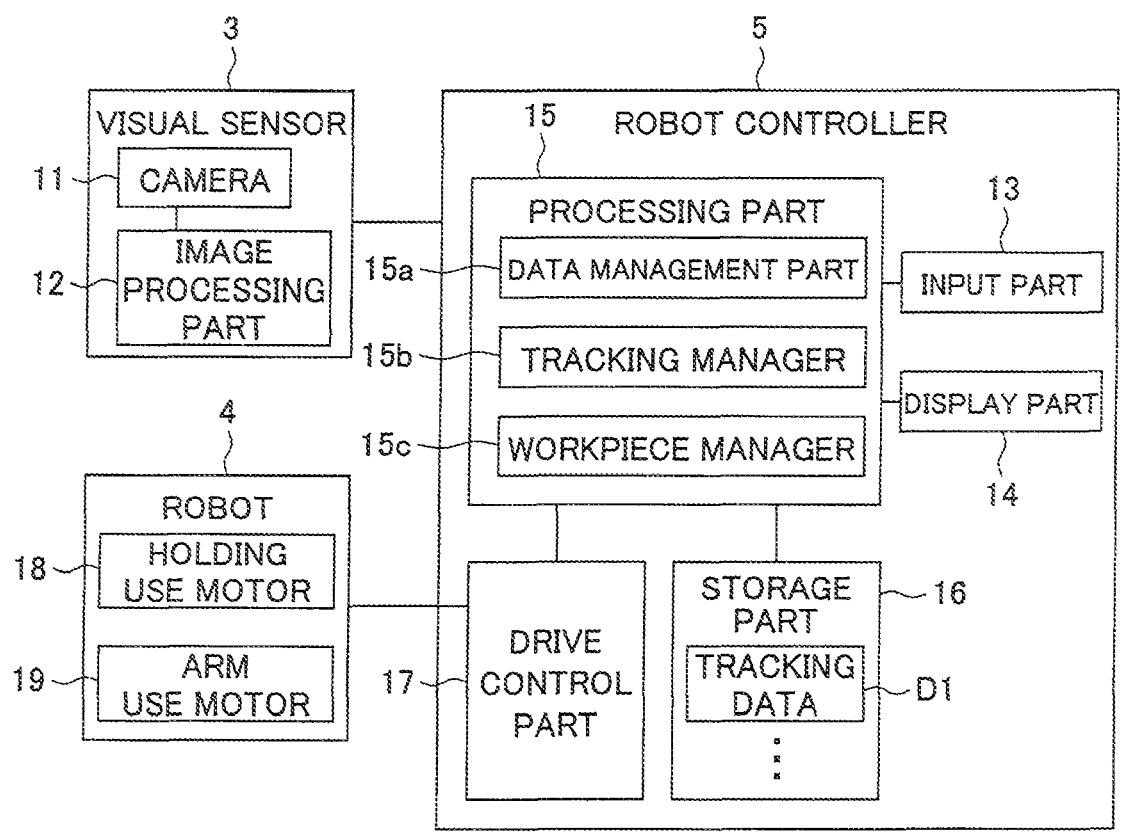
FIG. 2 A block diagram showing the configurations of a visual sensor, a robot, and a robot controller, forming the handling system according to the first embodiment.

FIG. 2 is a block diagram showing the configurations of the visual sensor, the robot, and the robot controller, comprising the handling system according to the first embodiment.

The visual sensor 3 is provided with a camera 11 and an image processing part 12. The camera 11 is comprised of, for example, a CCD camera.

The camera 11 is disposed so as to capture an image of the belt conveyance surface 2a on which the workpiece 10 is placed, and is provided so that, for example, a tracking range S shown in FIG. 1 becomes one time of capturing range.

The image processing part 12 is configured so as to process the image data output from the camera 11 and produce the later explained workpiece data S3a.

Further, the visual sensor 3 is provided with a not shown communication part etc., for transmitting the trigger signal S3b indicating the capturing timing of the camera 11 and the workpiece data S3a explained above to the communication line.

The robot controller 5 is provided with an input part 13, display part 14, processing part 15, storage part 16, and drive control part 17.

The input part 13 is configured so as to allow a user to perform a setting operation etc. and is connected so as to input the setting content to the processing part 15. The display part 14 is connected to the processing part 15 so as to display the operation/setting content explained above and operation status etc. of the robot 4.

The processing part 15 is provided with a data management part 15a, tracking manager 15b, and workpiece manager 15c.

The data management part 15a is configured to perform processing for making the storage part 16 store each data and an operation of reading out the data from the storage part 16.

The tracking manager 15b is configured to monitor the position indicated by each tracking data D1, in other words, the tracking range S.

The workpiece manager 15c is configured to select the workpiece 10 from among a plurality of workpieces 10 existing within the tracking range S, for which the robot 4 is to be made to work.

The storage part 16 stores the tracking data D1 according to the control of the processing part 15, and the database is constructed by storing a plurality of the tracking data D1.

The tracking data D1 is comprised of a number of workpiece(s) 10 extracted from the image data obtained by one time capturing operation by the visual sensor 3, the workpiece data S3a of each workpiece 10 extracted, and the movement amount indicated by the output signal S6 of the conveyor encoder 6.

The drive control part 17 is connected and configured to produce control signals for driving later explained parts of the robot 4 and operate the robot 4.

The robot 4 is provided with a holding use motor 18 for driving a holding part 4a and an arm use motor 19 for driving an arm part 4b for supporting the holding part 4a.

Figure 3:
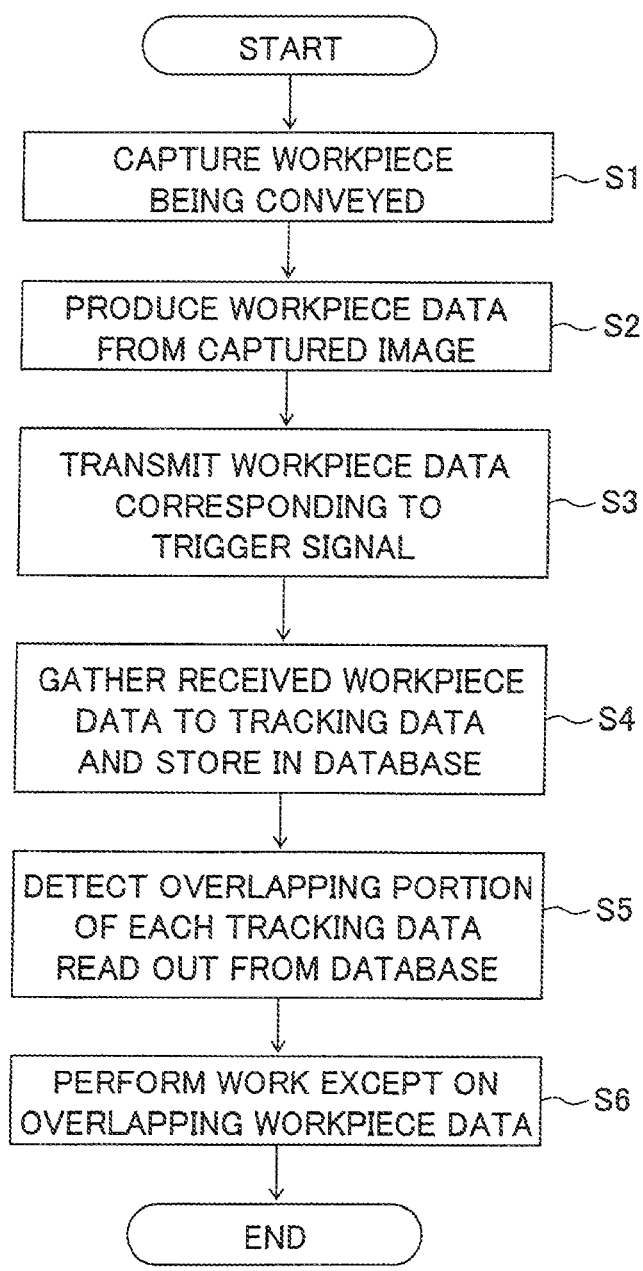
FIG. 3 A flow chart showing an operation of the handling system according to the first embodiment.

FIG. 3 is a flow chart showing the operation of the handling system according to the first embodiment.

At the upstream side of conveyance of the belt conveyor 2, the visual sensor 3 captures images within a constant capturing range from the end of the upstream side of the belt conveyance surface 2a or an imaging origin 20a in the vicinity of the belt conveyance surface 2a, the captured image being for example, images within the tracking range S.

In more detail, the camera 11 of FIG. 2 captures an image of the tracking range S of the belt conveyance surface 2a at its own capturing timing (step S1).

The image processing part 12 extracts a shape of the workpiece 10 included in the image of the tracking range S, compares this shape with a shape data etc. for every kind (type) workpiece stored by the image processing part 12 itself, and identifies the kind of the workpiece 10.

Further, the image processing part 12 detects coordinate values of any portion of the workpiece 10 from among images within the tracking range S, and produces the workpiece data S3a of that workpiece 10 (step S2).

These coordinate values are values expressed in a coordinate system used in each processing performed in the camera 11 or visual sensor 3 itself. Note that, the visual sensor 3 may also produce coordinate values indicating a posture of the workpiece in the workpiece data S3a.

The visual sensor 3 sequentially transmits the produced workpiece data S3a to the robot controller 5 as explained above (step S3).

At this time, the visual sensor 3 transmits the workpiece data S3a of all workpieces 10 included in one image and data indicating the number of the workpiece data S3a, corresponding to one trigger signal S3b.

Figure 4:
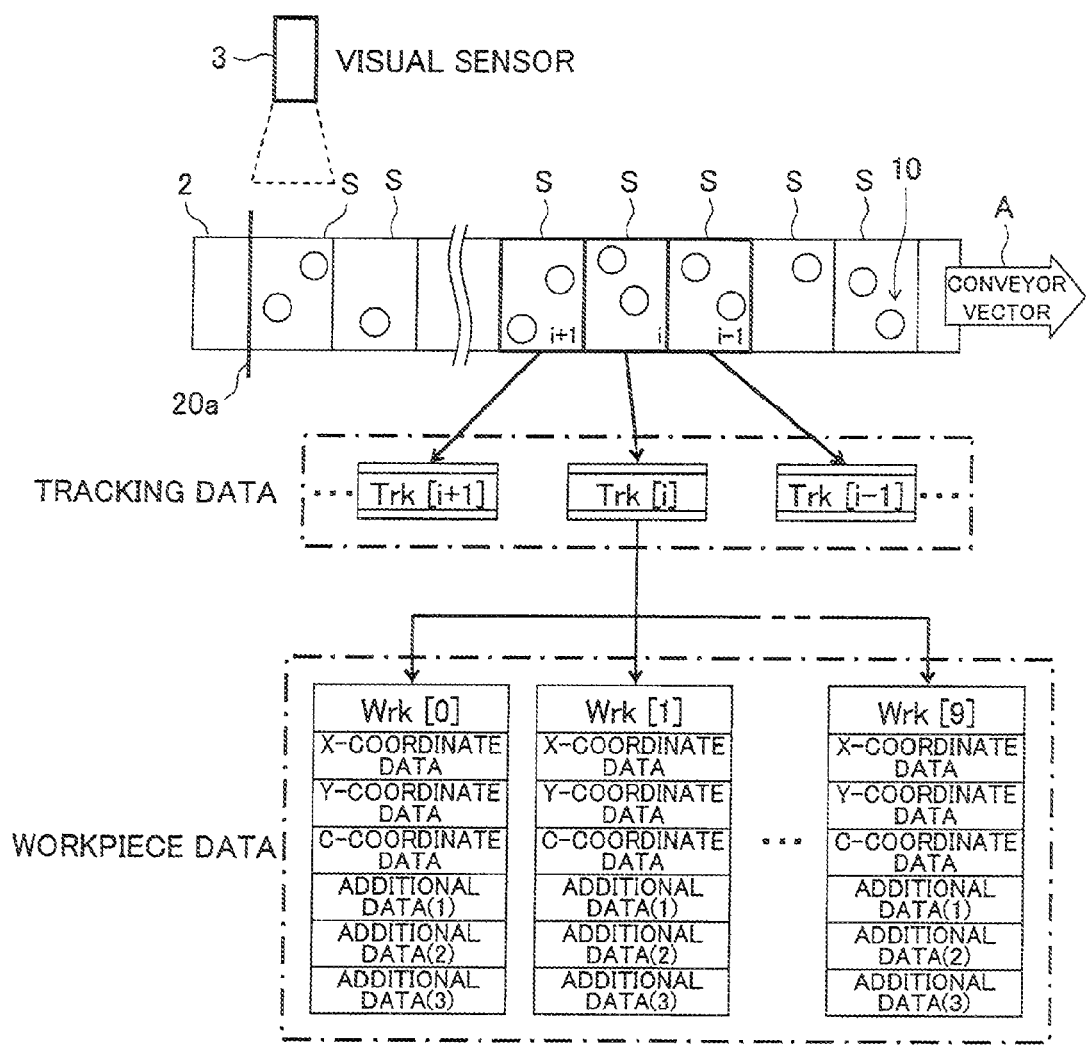
FIG. 4 An explanatory view showing the operation of the handling system according to the first embodiment.

FIG. 4 is an explanatory view showing the operation of the handling system according to the first embodiment. This diagram expresses the operation that the data management part 15a of the robot controller 5 stores each workpiece data S3a sent from the visual sensor 3 into the storage part 16.

When the communication part etc. explained above receives the plurality of workpiece data S3a transmitted from the visual sensor 3 for each trigger signal S3b, the data management part 15a gathers these workpiece data S3a into one to thereby produce the tracking data D1.

Further, the data management part 15a adds the movement amount of the belt conveyor 2 indicated by the output signal S6 input from the conveyor encoder 6 in the process of step S4 of FIG. 3 to produce the tracking data D1 described above, and stores the resultant tracking data in the storage part 16 to construct the database.

FIG. 4 shows the tracking data D1 produced from the image captured by the visual sensor 3 at the [i−1]th order as tracking data Trk[i−1].

Further, FIG. 4 shows the tracking data D1 produced from the image captured by the visual sensor 3 at the [i]th order as tracking data Trk[i].

Further, FIG. 4 shows the tracking data D1 produced from the image captured by the visual sensor 3 at the [i+1]th order as tracking data Trk[i+1].

The tracking data Trk[i] shown in FIG. 4 represents, for example, data at the time of detection of ten (10) workpieces 10 from the tracking range S captured by the visual sensor 3 at the [i]th order and is comprised of workpiece data Wrk[0] to Wrk[9].

For example, when producing the tracking data Trk[i] described above, upon receipt of the trigger signal S3b sent from the visual sensor 3 at the [i]th order, the data management part 15a secures a region for storing the tracking data Trk[i] linked with this trigger signal S3b in the storage part 16.

Further, the data management part 15a stores the output signal S6 input from the conveyor encoder 6 here, that is, the data showing the movement amount of the belt conveyor 2 as a component of the tracking data Trk[i] explained above, in the storage part 16.

Furthermore, the data management part 15a sequentially memorizes/stores the workpiece data Wrk[0] to Wrk[9] sent from the visual sensor 3 in the region of the tracking data Trk[i] secured in the storage part 16 explained above.

Note that, for facilitating understanding in FIG. 4, two workpieces 10 are shown in the [i]th tracking range S, that is, illustration of all workpieces 10 within the [i]th tracking range is omitted.

Further, the above [i−1], [i], [i+1], etc. showing orders of the capture by the visual sensor 3 are whole number values added as tracking numbers to the tracking data D1.

The workpiece data S3a sequentially transmitted by the visual sensor 3 to the robot controller 5 is comprised of, for example, the workpiece data Wrk[0] to Wrk[9] shown in FIG. 4.

The workpiece data Wrk[0] to Wrk[9] have X-coordinate data and Y-coordinate data of the coordinate system used by the visual sensor 3 for its own processing and C-coordinate data representing rotation on an X-Y plane.

Further, the workpiece data Wrk[0] to Wrk[9] are comprised by adding a plurality of additional data, for example, additional data (1) to (3).

The additional data (1) to (3) are data representing conditions etc. related to a variety of processing and showing, for example, the type etc. discriminated by the visual sensor 3 as explained above. These additional data (1) to (3) are set in the visual sensor 3 as desired by a user.

The image processing part 12 of the visual sensor 3 performs processing for each image captured by the camera 11 as explained above.

If the camera 11 was operated to sequentially capture images of the conveyance surface 2a of the belt conveyor 2, for example, capture images while arranging end sections of images so as not to allow overlapping portions in each image, the entire shape of the workpiece 10 taken into the end section of one image sometimes will not fit in the image.

At such a time, the image processing part 12 cannot correctly recognize a workpiece 10 whose entire shape does not fit in one image, so there is a possibility that the workpiece data S3a cannot be produced or abnormal data is produced.

For this reason, when the capturing images of the conveyance surface 2a of the belt conveyor 2, the visual sensor 3 captures the images so that the end sections of images overlap to thereby suppress missing parts of the images of the workpiece 10 taken so that the workpiece data S3a corresponding to each workpiece 10 is reliably produced.

Figure 5:
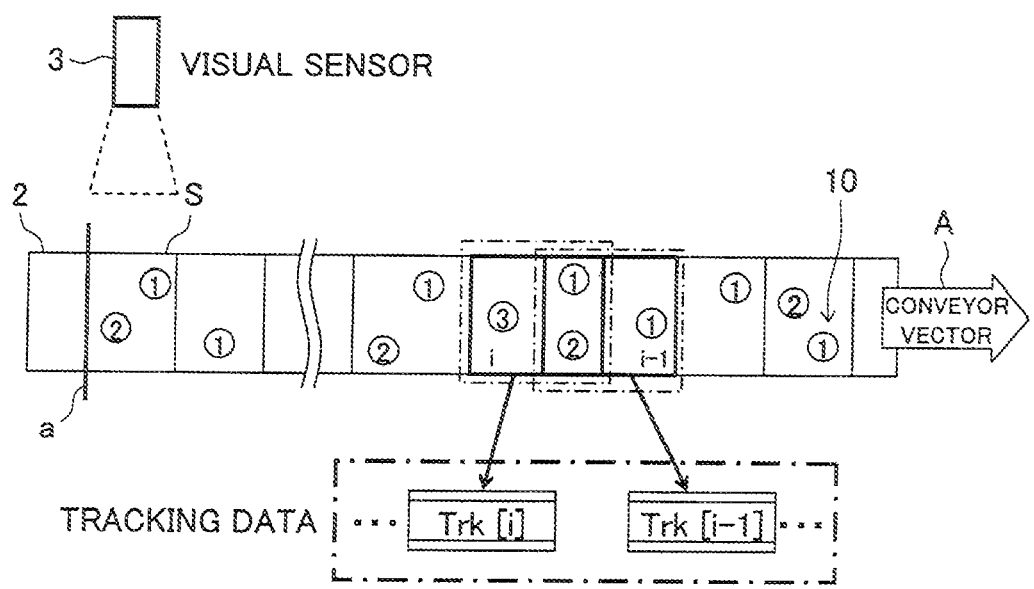
FIG. 5 An explanatory view showing the operation of the handling system according to the first embodiment.

FIG. 5 is an explanatory view showing the operation of the handling system according to the first embodiment. The tracking data D1 of FIG. 5 is shown with track numbers showing capturing orders attached thereto in the same way as the tracking data D1 shown in FIG. 4.

When the robot controller 5 stores each workpiece data S3a received from the visual sensor 3 as the tracking data D1 in the database, actually, as shown in FIG. 5, there is an overlapping portion in each tracking data D1.

Namely, in the process of step S4 explained above, the data management part 15a of the robot controller 5 stores each tracking data D1 including an overlapping portion explained above in the storage part 16.

Each workpiece 10 captured by the visual sensor 3 at the upstream side of conveyance of the belt conveyor 2 is conveyed to the position where the robot 4 is disposed after taking a predetermined time.

The robot controller 5 controls the operation of the robot 4 by using the database stored in the storage part 16 and performs the handling operation for the workpiece 10 conveyed to the position of the robot 4.

The handling operation of the robot 4 is carried out in a workpiece detection area provided between a workpiece detection area start point 20b and a workpiece detection area end point 20c shown in FIG. 1.

The tracking manager 15b of the robot controller 5 monitors the data showing the movement amount of the belt conveyor 2 included in each tracking data D1 and detects the position of each workpiece 10 during conveyance.

Specifically, the tracking manager 15b extracts the data showing the movement amount of each tracking data D1 stored in the database.

Furthermore, the tracking manager 15b uses the data showing the movement amount extracted as described above to recognize to which tracking data D1 the tracking range S during movement in the workpiece detection area corresponds.

The tracking manager 15b reads out the above recognized tracking data D1 from the storage part 16 by using the data management part 15a.

The tracking data D1 sequentially read out by the tracking manager 15b includes the overlapping workpiece data S3a as explained above.

The processing part 15 of the robot controller 5 suitably performs a processing operation for detecting the overlapping portion from each of the tracking data D1 sequentially read out from the database by the tracking manager 15b in the process of step S5 of FIG. 3.

Figure 6:
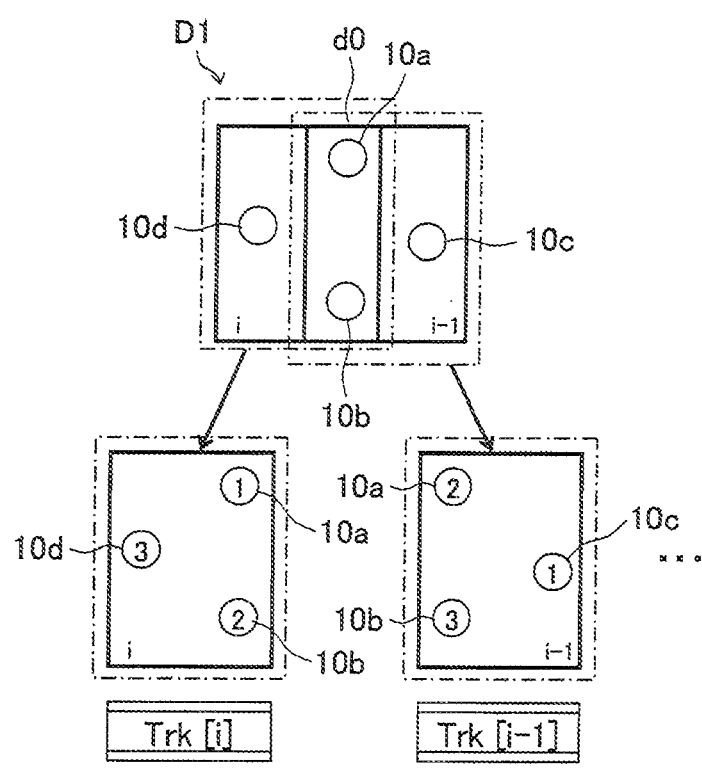
FIG. 6 An explanatory view showing an overlapping portion of tracking data processed by a processing part of the handling system according to the first embodiment.

FIG. 6 is an explanatory view showing an overlapping portion of the tracking data processed by the processing part of the handling system according to the first embodiment.

In FIG. 6, the tracking data D1 sequentially read out from the storage part 16 by the processing part 15 are defined as, for example, tracking data Trk[i−1], and the tracking data Trk[i] following this.

Further, there is an overlapping portion d0 in adjacent portions of the tracking data Trk[i−1] and tracking data Tri[i] in FIG. 6.

In the overlapping portion do, there are two workpiece data S3a. These workpiece data S3a correspond to a workpiece 10a and a workpiece 10b.

In the tracking data D1 exemplified in FIG. 6, the tracking data Trk[i−1] includes workpiece data S3a of the workpieces 10a, 10b, and 10c, and the tracking data Trk[i] includes each workpiece data S3a of the workpieces 10a, 10b, and 10d.

At this time, the processing part 15 performs processing detecting the workpieces 10a and 10b existing in the overlapping portion d0 of the tracking data Trk[i] and tracking data Trk[i−1].

In the process of step S5 of FIG. 3, the processing part 15 sequentially reads out the tracking data Trk[i] and tracking data Trk[i−1] from the database as explained above.

Further, the processing part 15 finds a relative distance between the workpieces by using coordinate values of the workpiece data S3a included in these tracking data D1.

Specifically, for example, the processing part finds the distances between the workpiece 10a of the tracking data Trk[i] and the workpieces 10a, 10b, and 10c of the tracking data Trk[i−1].

Figure 7:
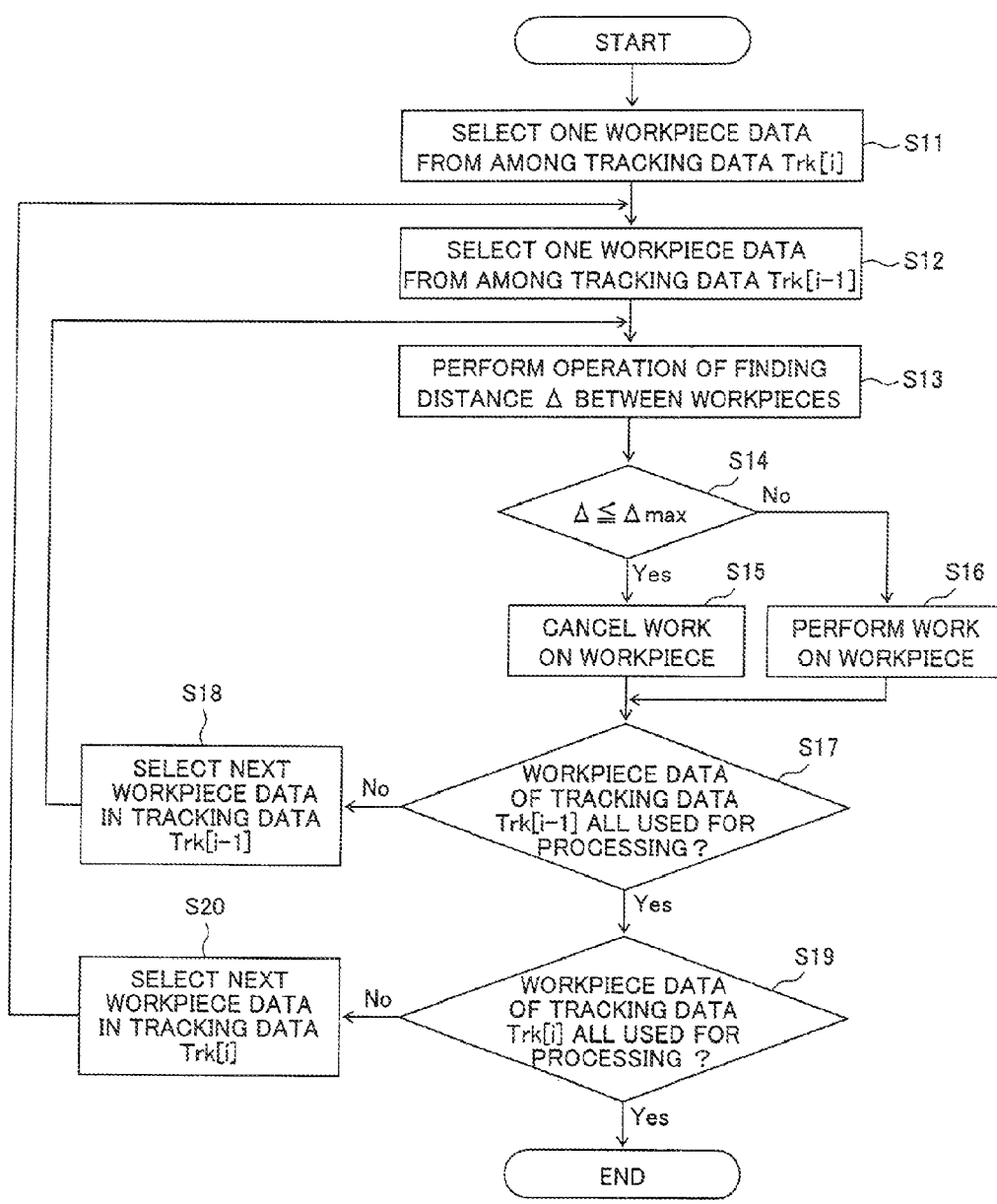
FIG. 7 A flow chart showing the operation of the processing part of the handling system according to the first embodiment.

FIG. 7 is a flow chart showing the operation of the processing part of the handling system according to the first embodiment.

The processing part 15 selects any one workpiece data S3a, for example, the workpiece data S3a of the workpiece 10a on the bottom left bottom in FIG. 6, from among the tracking data Trk[i] read out from the database as explained above (step S11).

Next, the processing part selects any one workpiece data S3a, for example, the workpiece 10a on the bottom right side in FIG. 6, from among the tracking data Trk[i−1] previously read out from the database (step S12).

The processing part 15 uses the workpiece data S3a selected in the process of step S11 and the workpiece data S3a selected in the process of step S12 (step S13) to find the distance between the workpieces indicated by these workpiece data S3a by processing.

For example, the processing part defines the coordinate values of the workpiece data S3a selected in the process of step S11 as (x2,y2) and the coordinate values of the workpiece data S3a selected in the process of step S12 as (x1,y1).

A distance Δ between the workpieces corresponding to these workpiece data S3a can be found according to the following equation (1).

$$\Delta = ((x2-x1)^2 + (y2-y1)^2)^{1/2} \quad (1)$$

The processing part 15 compares the distance Δ found according to the processing of equation (1) with an overlapping judgment prescribed value Δmax which is set in advance and judges whether the distance Δ is not more than the overlapping judgment prescribed value Δmax (step S14).

When judging in the process of step S14 that the distance Δ is not more than the overlapping judgment prescribed value Δmax, the processing part 15 cancels the work for the workpiece by the workpiece manager 15c (step S15).

Note that the coordinate values (x2,y2) and coordinate values (x1,y1) handled here are, for example, values represented by using an absolute origin provided in the vicinity of the belt conveyor 2 and are coordinate values produced by the processing part 15 by adding the movement amount indicated by the output signal S6 input from the conveyor encoder 6.

The coordinate values handled by the processing part 15 are, for example, values of a world coordinate system used for the control of the robot 4, while the distance Δ between the workpieces found as explained above is a relative value.

By using the relative value, the processing part 15 becomes able to suitably compare the distance Δ between the workpieces no matter what coordinate system the visual sensor 3 uses to produce the workpiece data S3a.

In the process of step S14 explained above, when obtaining the comparison result indicating that the distance Δ is not more than the overlapping judgment prescribed value Δmax, the processing part 15 judges as follows.

The processing part judges that the workpiece 10a having the coordinate values (x2,y2) included in the tracking data Trk[i] and the workpiece 10a having the coordinate values (x1,y1) included in the tracking data Trk[i−1] are identical.

When judging this, the processing part 15 cancels the processing of the workpiece 10a corresponding to the workpiece data S3a having the coordinate values (x2,y2), that is, the workpiece data S3a corresponding to the workpiece 10a of the tracking data Trk[i].

In other words, the processing part 15 controls the workpiece manager 15c so that the workpiece manager 15c does not perform processing corresponding to the workpiece 10a of the tracking data Trk[i].

When judging in the process of step S14 that the distance Δ is larger than the overlapping judgment prescribed value Δmax, the processing part 15 makes the workpiece manager 15c operate so as to perform the work for the workpiece 10a of the tracking data Trk[i] (step S16).

After processing the process of step S15 or process of step S16, the processing part 15 performs the following processing.

For example, for the workpiece 10a of the tracking data Trk[i], the processing part judges whether the workpiece data S3a of all workpieces 10a to 10c included in the tracking data Trk[i−1] were used for the processing explained above (step S17).

When judging in the process of step S17 that all workpiece data S3a were not used for the processing, the processing part 15 performs the following processing operation.

The processing part selects the next workpiece data in the tracking data Trk[i−1] (step S18), returns to the process of step S13, and performs the following processes in the same way as the explanation given before.

When judging in the process of step S17 that all workpiece data S3a were used for processing, the processing part 15 judges whether the workpiece data of the tracking data Trk[i] were all used for the above processing (step S19).

When judging in the process of step S19 that all workpiece data were not used for the processing, the processing part 15 performs the following processing operation.

The processing part selects the next workpiece data in the tracking data Trk[i] (step S20), returns to the process of step S12, and performs the following processes in the same way as the above explanation.

When judging in the process of step S19 that all workpiece data were used for the processing, the processing part 15 ends the processing operation of detecting the workpiece data overlapping the tracking data [i−1] and tracking data [i].

The processing part 15 performs the detection operation of the overlapping workpiece data explained hitherto for tracking data sequentially read out from the database.

The processing part 15 makes the workpiece manager 15c perform processing except on the workpiece data detected as overlapping in the process of step S6 of FIG. 3 and makes the robot 4 perform the work.

By the processing of the processing part 15 excluding the overlapping workpiece data in this way, the robot 4 no longer performs the work again for the workpiece 10 which it has already worked, so waste operation of the robot 4 is eliminated.

According to the handling system 1 of the first embodiment described above, the processing part 15 of the robot controller 5 excludes the overlapping workpiece data included in each tracking data read out from the database, therefore the waste operation of the robot 4 can be suppressed.

Further, the overlapping workpiece data can be detected without regard as to the coordinate system used when producing the workpiece data S3a by the visual sensor 3.

Second Embodiment

A handling system according to a second embodiment of the present invention is configured in the same way as the handling system 1 shown in FIG. 1 and FIG. 2. Here, an overlapping explanation of parts configured in the same way as those of the handling system 1 explained in the first embodiment, is omitted. Further, in the following explanation, parts which are same as or corresponding to the parts explained in the first embodiment will be explained by using the same notations.

Figure 8:
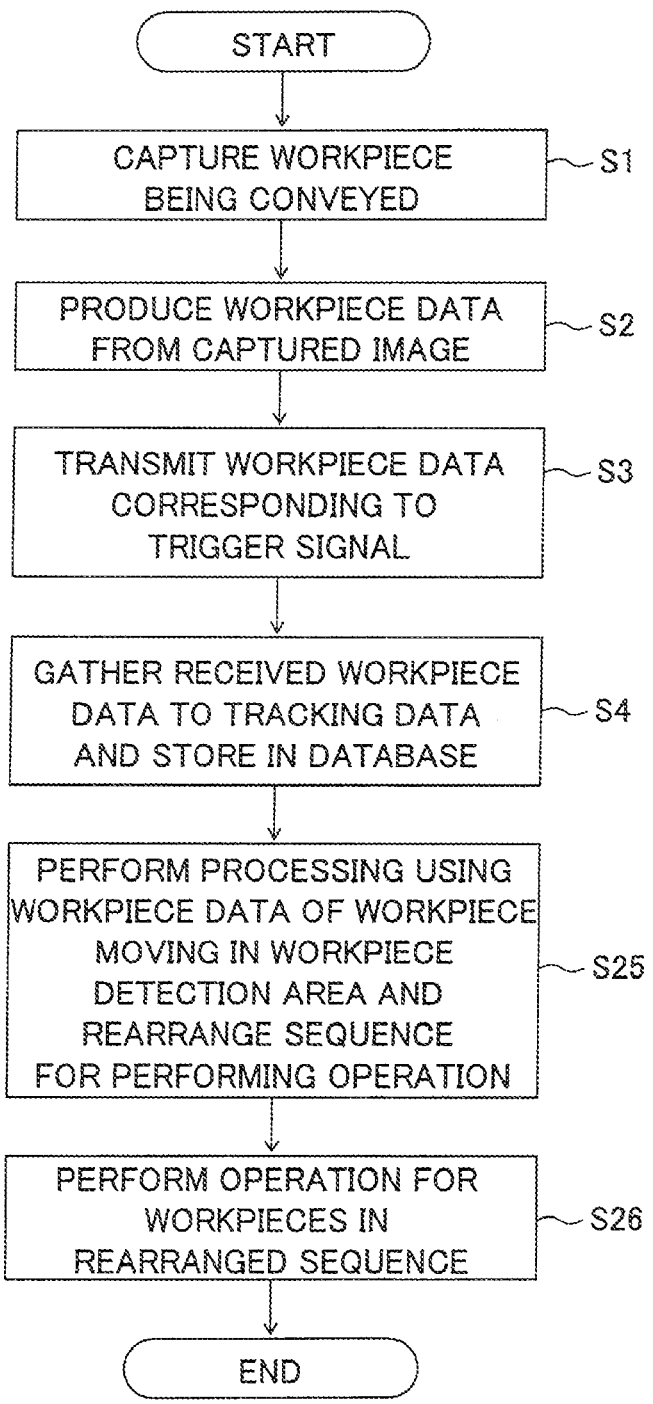
FIG. 8 A flow chart showing the operation of a handling system according to a second embodiment of the present invention.

FIG. 8 is a flow chart showing the operation of the handling system according to the second embodiment of the present invention. This flow chart uses the same notations for steps performing the same processing as that in the steps shown in FIG. 3.

At step S1, at the upstream side of conveyance of the belt conveyor 2 as explained above, the camera 11 of the visual sensor 3 captures images of the workpieces 10 placed on the belt conveyance surface 2a.

At step S2, the image processing part 12 of the visual sensor 3 extracts the portion of each workpiece 10 from the image captured by the camera 11 to produce the workpiece data S3a of each of the workpieces 10.

At step S3, the above not shown communication part of the visual sensor 3 transmits the above workpiece data S3a corresponding to a trigger signal S3b showing the capturing timing of the camera 11.

At step S4, the robot controller 5, in more detail, a not shown reception part of the robot controller 5, receives the workpiece data S3a transmitted in the process of step S3, while the data management part 15a makes the storage part 16 store the workpiece data S3a.

At this time, the workpiece data S3a sent corresponding to one trigger signal S3b are gathered as one tracking data D1 and stored, whereby a database is constructed.

At step S25, the tracking manager 15c of the robot controller 5 monitors output-signals of the conveyor encoder 6.

Further, the data management part 15a reads out the tracking data D1 including the workpiece 10 moving in the workpiece detection area shown in FIG. 1 from the storage part 16 in accordance with the monitoring result of the tracking manager 15b.

The workpiece manager 15c performs the processing by using each workpiece data forming the tracking data D1 explained above which is read out from the storage part 16 by the data management part 15a, and rearranges orders for performing the handling operation by the robot 4 in accordance with this processing result.

At step S26, the drive control part 17 of the robot controller 5 controls the operation of the robot 4 so as to hold the workpieces 10 according to the sequence rearranged at step S25.

The handling system 1 according to the second embodiment schematically operates in this way.

Next, detailed operations of the parts will be explained.

The visual sensor 3 captures images within a constant capturing range, for example, images within the tracking range S from the end of the upstream side of the belt conveyance surface 2a or the imaging origin 20a in the vicinity of that on the upstream side of conveyance of the belt conveyor 2.

In more detail, the camera 11 in FIG. 2 captures an image in the tracking range S of the belt conveyance surface 2a at its own capturing timing (step S1).

The image processing part 12 extracts the shape of one workpiece 10 included in the image within the tracking range S, compares this shape with the shape data etc. for each type stored by the image processing part 12 itself, and identifies the type of the workpiece 10.

Further, the image processing part 12 detects the coordinate values of any portion of the workpiece 10 from among images in the tracking range S and produces the workpiece data S3a of the workpiece 10 (step S2).

These coordinate values are values expressed by the coordinate system used in each processing performed by the camera 11 or visual sensor 3 itself.

Note that, the visual sensor 3 may produce data including coordinate values showing the posture of the workpiece in the workpiece data S3a as well.

The visual sensor 3 sequentially transmits the produced workpiece data S3a to the robot controller 5 as explained above (step S3).

The data management part 15a of the robot controller 5 gathers the received workpiece data S3a to the tracking data and stores the result into the database (step S4). This processing operation is carried out as explained in the first embodiment by using FIG. 4.

As explained above, when receiving a plurality of workpiece data S3a transmitted by the communication part etc. from the visual sensor 3 for each trigger signal S3b, the data management part 15a gathers these workpiece data S3a into one data and produces the tracking data D1.

Further, the data management part 15a adds data showing the movement amount of the belt conveyor 2 input from the conveyor encoder 6 to produce the above tracking data D1, and stores this in the storage part 15 to construct a database.

Note that, the tracking data Trk[i] shown in FIG. 4 represents data at the time when, for example, 10 workpieces 10 are detected from the tracking range S captured by the visual sensor 3 at the [i]th order and is comprised of the workpiece data Wrk[0] to Wrk[9].

At the time of production of, for example, the above tracking data Trk[i], when receiving the trigger signal S3b sent from the visual sensor 3 at the [i]th order, the data management part 15a secures a region for storing the tracking data Trk[i] linked to this trigger signal S3b in the storage part 16.

Further, the data management part 15a stores signals input from the conveyor encoder 6 here, that is, the data showing the movement amount of the belt conveyor 2 in the storage part 16, as the component of the tracking data Trk[i] explained above.

Furthermore, the data management part 15a memorizes/stores the workpiece data Wrk[0] to Wrk[9] sequentially sent from the visual sensor 3 in the region of the tracking data Trk[i] secured in the storage part 16 explained above.

Note that, for easy understanding in FIG. 4, two workpieces 10 are shown in the [i]th tracking range S, that is, illustration of all workpieces 10 placed within the [i]th tracking range is omitted.

Further, the above [i−1], [i], [i+1], etc. showing orders of capture by the visual sensor 3 are tracking numbers attached to the tracking data D1.

The workpiece data S3a sequentially transmitted by the visual sensor 3 to the robot controller 5 are comprised, for example, of the workpiece data Wrk[0] to Wrk[9] shown in FIG. 4.

The workpiece data Wrk[0] to Wrk[9] have X-coordinate data and Y-coordinate data of the coordinate system used by the visual sensor 3 for their own processing and C-coordinate data representing rotation on an X-Y plane.

Further, the workpiece data Wrk[0] to Wrk[9] are comprised by adding a plurality of additional data, for example, additional data (1) to (3). The additional data (1) to (3) are data representing conditions etc. related to a variety of processing and showing, for example, the type etc. discriminated by the visual sensor 3 as explained above. These additional data (1) to (3) are set in the visual sensor 3 as desired by the user.

The image processing part 12 of the visual sensor 3 performs processing for each image captured by the camera 11 as explained above.

The robot controller 5 uses the database stored in the storage unit 16 to control the operation of the robot 4 and perform the handling work of the workpiece 10 conveyed to the position of the robot 5.

The handling work of the robot 4 is performed at the workpiece detection area provided between the workpiece detection area start point 20b and workpiece detection area end point 20c shown in FIG. 1.

The tracking manager 15b of the robot controller 5 monitors the data showing the movement amount included in each tracking data D1 and detects the position of each workpiece 10 during conveyance.

Specifically, the tracking manager 15b extracts the data showing the movement amount of each tracking data D1 stored in the database.

Furthermore, the tracking manager 15b uses the data showing the movement amount extracted as described above to recognize to which tracking data D1 the tracking range S during movement in the workpiece detection area corresponds.

The tracking manager 15b reads out the above recognized tracking data D1 from the storage part 16 by using the data management part 15a.

The workpiece manager 15c receives as input the tracking data D1 read out from the storage part 16 explained above, that is, the tracking data D1 recognized by the tracking manager 15b.

The workpiece manager 15c selects the data to be processed from among a plurality of workpiece data included in the input tracking data D1.

In other words, the workpiece manager selects the data to be held by the robot 4 from among a plurality of workpieces 10 reaching the workpiece detection area.

Figure 9:
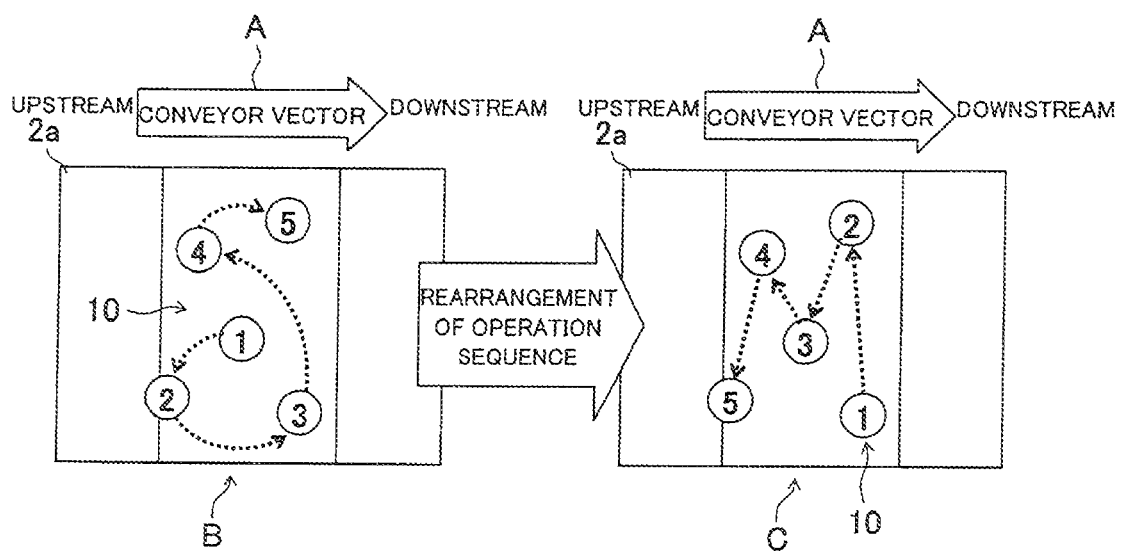
FIG. 9 An explanatory view showing the operation of the handling system according to the second embodiment.

FIG. 9 is an explanatory view showing the operation of the handling system according to the second embodiment.

This figure represents a state B where the sequence of the workpiece data stored in the database and workpieces 10 placed on the belt conveyance surface 2a are linked with each other, and a state C where the sequence to be held by the robot 4 and the workpieces 10 placed on the belt conveyance surface 2a are linked with each other.

Note that, the above state B is one example of the sequence obtained by sequentially storing the workpiece data S3a transmitted from the visual sensor 3 in the database and is not limited to the shown sequence.

The workpiece manager 15c rearranges the sequence for making the robot 4 hold the workpieces 10 as in the state C in the process of step S25 of FIG. 8.

Specifically, in one tracking range S, the workpiece manager performs rearrangement of the workpiece data corresponding to the workpieces 10 so that the robot 4 holds these data in order from the workpiece 10 on the downstream side of conveyance in one tracking range S.

Figure 10:
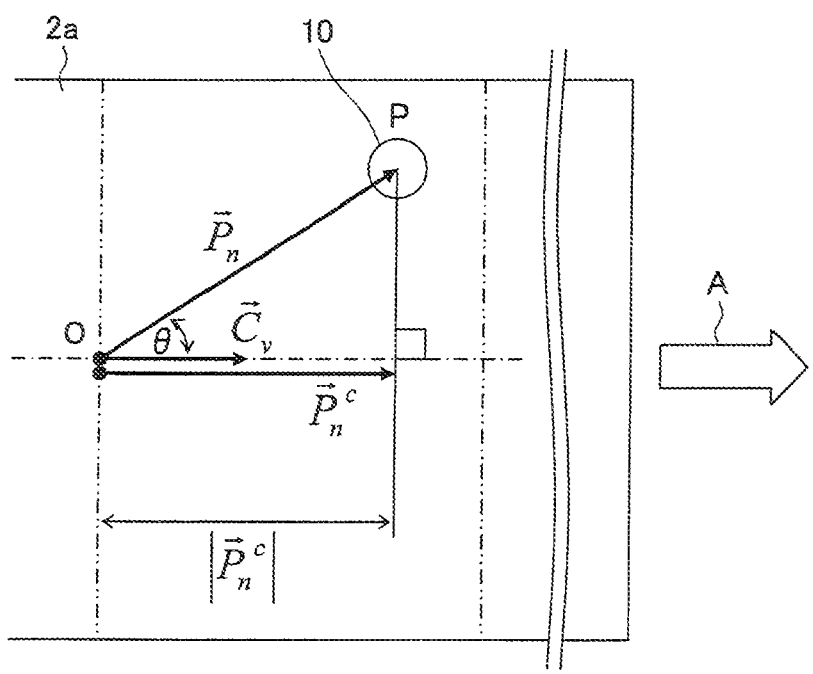
FIG. 10 An explanatory view showing processing performed by the robot controller of the handling system according to the second embodiment.

FIG. 10 is an explanatory view showing processing performed by the robot controller of the handling system according to the second embodiment.

A shown "O" is any reference point. Further, a vector Cv is a unit vector determined by, for example, a user and shows the same direction as the conveyor vector A representing the conveyance operation of the belt conveyor 2.

The reference point O is set, for example, on the upstream side of conveyance from the tracking range S moving in the workpiece detection area. The reference point O exemplified in FIG. 10 is provided at the center portion in a width direction of the belt conveyance surface 2a.

For example, on the surface of the belt conveyance surface 2a, when the coordinates of the position P of the workpiece 10 are (Px,Py), and the coordinates of the reference point O are (Ox,Oy), a vector Pn from the reference point O to the workpiece 10 becomes (Px-Ox,Py-Oy).

When an angle formed by the vector Pn and the vector Cv is θ, the mapping vector $Pn^c$ of the workpiece 10 is represented as in the following equation (2).

$$|\vec{P}_n{}^c| = |\vec{P}_n|\cos(\theta) \quad (2)$$

Here, the inner product of the vector Pn and the vector Cv is represented as in the following equation (3).

$$|\vec{P}_n| \cdot |\vec{C}_v|\cos(\theta) = \vec{P}_n \cdot \vec{C}_v \quad (3)$$

The vector Cv is the unit vector as explained above, therefore the scalar quantity is "1". For this reason, the above inner vector becomes as in the next equation (4).

$$|\vec{P}_n|\cos(\theta) = \vec{P}_n \cdot \vec{C}_v \quad (4)$$

From equation (2) and equation (4) explained above, the scalar quantity of the mapping vector $Pn^c$ is represented as in the following equation (5).

$$|\vec{P}_n{}^c| = \vec{P}_n \cdot \vec{C}_v \quad (5)$$

In this way, the scalar quantity of the mapping vector $Pn^c$ of the workpiece 10 can be found by the inner product of the vector P and the vector Cv.

For example, the workpiece manager 15c of the processing part 15 finds the scalar quantity of the mapping vector Pn for all workpiece data included in one tracking data D1 in this way.

By representing the position of each workpiece 10 according to the scalar quantity of the mapping vector $Pn^c$, even in a case where the coordinate system of the workpiece data S3a sent from the visual sensor 3 does not match with the conveyance direction of the belt conveyor 2, this can be used for the control of the operation of the robot 4.

Further, no matter how the coordinate origin of the image captured by the visual sensor 3 is arranged, it becomes possible to use the same for the control of the operation of the robot 4.

For example, when the quantity of the workpiece data included in one tracking data D1 is 10, the scalar quantities of the mapping vector Pn of each workpiece data found as explained above are arranged as in the following data train (6).

$$\{|\vec{P}_1{}^c|, |\vec{P}_2{}^c|, \ldots |\vec{P}_{10}{}^c|\} \quad (6)$$

When the origin O is set at the upstream side of conveyance as explained above, as the scalar quantity of the mapping vector $Pn^c$, the workpiece 10 located at the downstream side of conveyance becomes a large value.

The processing part 15 rearranges scalar quantities by using, for example, a selection sort method. For example, the workpiece manager 15c of the processing part 15 compares scalar quantities in the data train (6) and rearranges these in a sequence from the data having the largest value.

The workpiece manager 15c sequentially selects the workpiece data corresponding to the scalar quantities arranged in the data train (6).

The workpiece manager 15c selects the workpiece data in order from the workpiece data having the scalar quantity of the largest mapping vector $Pn^c$ as the workpiece data used for the control of the operation of the robot 4 in this way.

In the process of step S26 of FIG. 8, the drive control part 17 uses the workpiece data sequentially selected by the workpiece manager 15c to control the operation of the robot 4 and makes the robot perform the handling operation in order from for example the workpiece 10 located at the downstream side of conveyance as indicated in the state C of FIG. 9.

As explained above, by the workpiece manager 15c rearranging the interior of the data train (series) (6) in accordance with the scalar quantity of the mapping vector $Pn^c$ and changing the sequence for processing the workpiece data corresponding to the rearranged data train (series) (6), the sequence of holding the workpieces 10 by the robot 4 can be changed.

According to the handling system of the second embodiment described above, the processing part 15 rearranges the sequence of the workpiece data used for the control of the operation of the robot 4, therefore the operation can be performed for the workpieces 10 which are conveyed to the belt conveyor 2 and are moving in the workpiece detection area with a high efficiency.

Further, the operation is carried out from the workpiece 10 located on the downstream side of conveyance by rearranging the sequence for performing the operation, therefore mistaken work on the workpiece 10 in conveyance can be suppressed.

Further, the waste operation of the robot 4 can be suppressed.

Third Embodiment

A handling system according to a third embodiment of the present invention is configured in the same way as the handling systems explained in the first embodiment and second embodiment explained above. An overlapping explanation is omitted for the configuration the same as those of the systems explained in the first and second embodiments.

Further, the handling system according to the third embodiment operates in schematically the same way as the system explained in the second embodiment. Here, the overlapping explanation is omitted for any operation the same as that of the system explained in the second embodiment. The operation which becomes the characteristic feature of the handling system according to the third embodiment will be explained.

Figure 11:
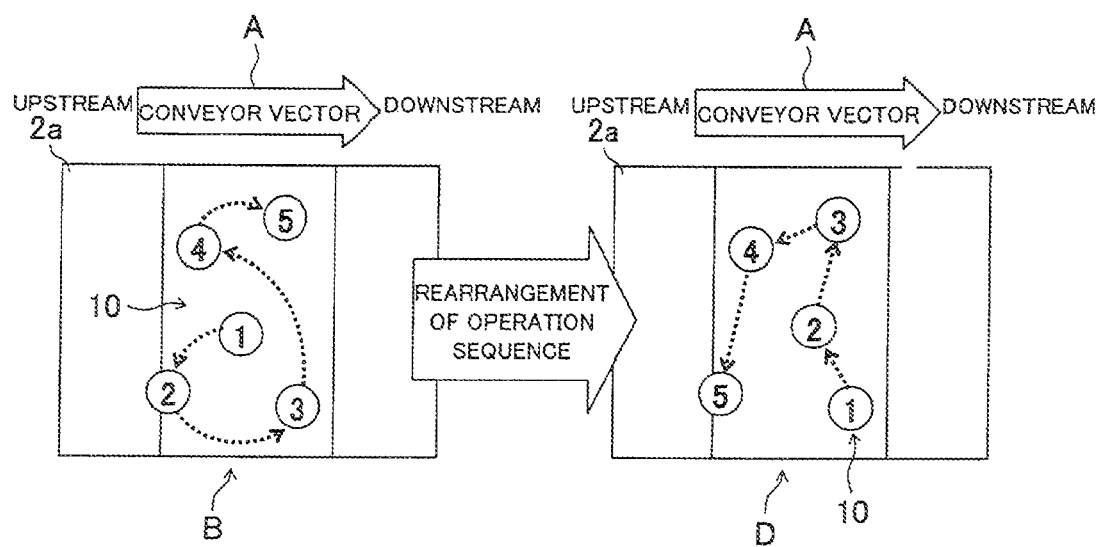
FIG. 11 An explanatory view showing the operation of a handling system according to a third embodiment of the present invention.

FIG. 11 is an explanatory view showing the operation of the handling system according to the third embodiment of the present invention.

This diagram expresses the state B where the sequence of workpiece data stored in the database and workpieces 10 placed on the belt conveyance surface 2a are linked, and a state D where the sequence of data to be held by the robot 4 and workpieces 10 placed on the belt conveyance surface 2a are linked.

Note that, the above state B is an example of the sequence obtained by sequentially storing the workpiece data transmitted from the visual sensor 3 in the database in the same way as the state B shown in FIG. 11 and is not limited to the shown sequence.

The workpiece manager 15c of the handling system 1 according to the third embodiment rearranges the sequence for making the robot 4 hold the workpieces 10 as in the state D in the process of step S25 of FIG. 8 explained in the second embodiment.

Specifically, in one tracking range S, rearrangement of the workpiece data corresponding to the workpieces 10 is carried out so that the robot 4 holds the data in order from the workpiece 10 on the downstream side of conveyance.

For example, the workpiece 10 placed at the downstream most side of conveyance is found by the processing explained above in the second embodiment.

Next, the workpiece 10 placed at the position nearest this workpiece 10 is detected by comparing, for example, coordinate values of the workpiece data. In this way, workpieces 10 placed nearby are sequentially detected, and the workpiece data are rearranged according to the detected sequence.

As described above, by the workpiece manager 15c rearranging the workpiece data and sequentially outputting these to the drive control part 17, the robot 4 performs work on the workpieces 10 in the sequence shown in the state D of FIG. 11.

According to the handling system 1 of the third embodiment described above, the processing part 15 of the robot controller 5 rearranges the sequence of the workpiece data used for the control of the operation of the robot 4, therefore work can be performed on the workpieces 10 which are conveyed by the belt conveyor 2 and are moving in the workpiece detection area with a high efficiency.

Further, the sequence for performing the work is rearranged to start the work from the workpiece 10 located at the downstream side of conveyance and sequentially carry out the work on the neighboring workpieces 10, therefore it is possible to suppress mistaken work on a workpiece 10 in conveyance.

Further, the waste operation of the robot 4 can be suppressed.

INDUSTRIAL APPLICABILITY

As described above, the handling system, control device, and control method according to the present invention are suitable for a production system etc. performing predetermined processing by a robot etc. on workpieces conveyed by a belt conveyor.

REFERENCE SIGNS LIST

1 . . . handling system, 2 . . . belt conveyor, 3 . . . visual sensor, 4 . . . robot, 4a . . . holding part, 4b . . . arm part, 5 . . . robot controller, 10, 10a, 10b, 10c, 10d . . . workpieces, 11 . . . camera, 12 . . . image processing part, 13 . . . input part, 14 . . . display part, 15 . . . processing part, 15a . . . data management part, 15b . . . tracking manager, 15c . . . workpiece manager, 16 . . . storage part, 17 . . . drive control part, 18 . . . holding use motor, and 19 . . . arm use motor.

The invention claimed is:

1. A handling system comprising:
a conveyer configured to convey a plurality of workpieces;
a single robot configured to perform a predetermined work on the plurality of workpieces;
a visual sensor configured to capture images of the plurality of workpieces being conveyed by the conveyer and producing workpiece data indicating every workpiece in the captured images; and
a controller configured to:
put the workpiece data in order for each of the images captured by the visual sensor to thereby produce tracking data,
use a database in which the tracking data is stored to control the single robot to perform the predetermined work on the one of the plurality of workpieces conveyed to a position where the single robot works,
detect, using the tracking data, a workpiece positioned in a nearest position to the single robot, wherein the workpiece positioned in the nearest position to the single robot is the workpiece in a most downstream side of a conveying direction relative to the other of the plurality of workpieces,
detect a next workpiece positioned in a nearest position to the detected workpiece,
repeat the detection of the next workpiece for all workpieces represented in the tracking data to generate a detected order of the workpieces, and
arrange a sequence for performing the work by the single robot in response to the detected order of the workpieces;
wherein the controller is configured to control the single robot to perform the predetermined work to every workpiece in the arranged sequence.

2. The handling system according to claim 1, wherein the controller comprises:
a storage part configured to store, in the database, tracking data captured from the workpiece data and transmitted from the visual sensor, tracking data being gathered with each image captured by the visual sensor,
a processing part configured to find a scalar quantity of a mapping vector of each workpiece from each workpiece data included in the tracking data and rearrange a work sequence to be performed by the robot based on the scalar quantity of the mapping vector of each of the workpieces, and
a drive control part configured to control the robot so as to perform the work of each of the workpieces in accordance with the sequence rearranged by the processing part.

3. The handling system according to claim 2, wherein the processing part is configured to perform processing to find an inner product of a vector (P) and a vector (Cv), to result in the scalar quantity of the mapping vector of each of the workpieces, where the vector (P) is defined as a vector from any reference point to each workpiece, and the vector (Cv) is defined as a reference vector indicating the conveyance direction of the conveying means from that any reference point the vector (Cv).

4. The handling system according to claim 1, wherein the controller is configured to perform predetermined processing for the workpiece data for every tracking data read out from the database to detect the overlapping workpiece data, and cancel the control of the operation of the robot based on the overlapping workpiece data.

5. The handling system according to claim 4, wherein the controller comprises:
a storage part configured to store, in the database, each tracking data produced for each of the images,
a processing part configured to find a distance between workpieces from the workpiece data included in the tracking data and judge whether the workpiece data overlap based on the distance between the workpieces, and
a drive control part configured to control the robot to perform work for each of the workpieces in accordance with the judged result of the processing part.

6. The handling system according to claim 5, wherein, when the distance between workpieces found from the workpiece data is smaller than a predetermined value, the processing part is configured to judge that the workpiece data corresponding to the workpieces having the distance do not overlap.

7. A control device comprising:
a storage device;
a processor configured to:
gather a plurality of workpiece data which are transmitted from a visual sensor for capturing images of a plurality of workpieces being conveyed by a conveyer and correspond to the workpieces for each image captured by the visual sensor to produce tracking data,
store the tracking data in the storage device, and
read out each of the tracking data from the storage device in accordance with a conveyance operation of the conveyer, and
a drive controller configured to:
make a single robot operate in accordance with an actual conveyance state of each of the workpieces in accordance with the processing result of the processor to make the robot perform work on each of the workpieces,
detect, using the tracking data, a workpiece positioned in a nearest position to the single robot, wherein the workpiece positioned in the nearest position to the single robot is the workpiece in a most downstream side of a conveying direction relative to the other of the plurality of workpieces,
detect a next workpiece positioned in a nearest position to the detected workpiece,
repeat the detection of the next workpiece for all workpieces represented in the tracking data to generate a detected order of the workpieces, and
arrange a sequence for performing the work by the single robot in response to the detected order of the workpieces;
wherein the controller is configured to make the single robot perform the work on every workpiece in the arranged sequence.

8. A control device according to claim 7, wherein the processor is configured to process each of the workpiece data to thereby detect overlapping workpiece data included in a plurality of tracking data, and
wherein the drive controller is configured to cancel the overlapping workpiece data detected by the processing to control the robot to perform work on each workpiece corresponding to each workpiece data which does not overlap.

9. A control device according to claim 7, wherein the processor is configured to process each of the workpiece data to thereby find a sequence for performing work on each workpiece corresponding to each of the data of the workpieces being conveyed by the conveyer, and wherein the drive controller is configured to control the robot to perform the work on each of the workpieces in accordance with the sequence rearranged by the processor.

10. A control method including:

capturing images, with a visual sensor, of a plurality of workpieces being conveyed by a conveyer and, for each image, gathering a plurality of workpiece data corresponding to each of the workpieces to produce tracking data;

storing each tracking data of each of the images in a database;

detecting, using the tracking data, a workpiece positioned in a nearest position to a single robot, wherein the workpiece positioned in the nearest position to the single robot is the workpiece in a most downstream side of a conveying direction relative to the other of the plurality of workpieces;

detecting a next workpiece positioned in a nearest position to the detected workpiece;

repeating the detection of the next workpiece for all workpieces represented in the tracking data to generate a detected order of the workpieces;

arranging a sequence for performing the work by the single robot in response to the detected order of the workpieces; and controlling the single robot to operate in accordance with an actual conveyance state of each of the workpieces to perform work on each of the workpieces in the arranged sequence.

11. The control method according to claim 10, wherein, the performing processing comprises detecting overlapping workpiece data included in the plurality of tracking data, and, the controlling comprises canceling the detected overlapping workpiece data and controlling the robot to perform the work on each workpiece corresponding to the workpiece data which does not overlap.

12. The control method according to claim 10, wherein, the performing processing comprises rearranging a sequence for performing work on for workpieces being conveyed by the conveyer, and the controlling comprises controlling the robot to perform work on each of the workpieces in accordance with the rearranged sequence.

13. A program which makes a computer execute the following routines:

a first routine of causing a visual sensor to capture images of a plurality of workpieces being conveyed by a conveyer and inputting from the visual sensor workpiece data produced by that visual sensor, a second routine of gathering the input workpiece data for each image captured by the visual sensor to produce tracking data and storing the tracking data in a database, a third routine of:

detecting, using the tracking data, a workpiece positioned in a nearest position to a single robot, wherein the workpiece positioned in the nearest position to the single robot is the workpiece in a most downstream side of a conveying direction relative to the other of the plurality of workpieces, detecting a next workpiece positioned in a nearest position to the detected workpiece, repeating the detection of the next workpiece for all workpieces represented in the tracking data to generate a detected order of the workpieces, arranging a sequence for performing the work by the single robot in response to the detected order of the workpieces; and a fourth routine of controlling the single robot to operate in accordance with an actual conveyance state of each of the workpieces in accordance with the result of the processing to make the robot perform work on each of the workpieces in the arranged sequence.

* * * * *